United States Patent [19]
Clausen et al.

[11] Patent Number: 5,466,032
[45] Date of Patent: Nov. 14, 1995

[54] INTRUSION BEAM FOR REINFORCING BODY PANELS OF A VEHICLE AND A VEHICLE DOOR PROVIDED WITH SUCH BEAM

[75] Inventors: Edvin L. Clausen, Tønder, Denmark; Julian Happian-Smith, Near Crewe, Great Britain

[73] Assignee: Norsk Hydro a.s., Oslo, Norway

[21] Appl. No.: 204,213

[22] PCT Filed: Sep. 4, 1992

[86] PCT No.: PCT/NO92/00141

§ 371 Date: Mar. 7, 1994

§ 102(e) Date: Mar. 7, 1994

[87] PCT Pub. No.: WO93/04886

PCT Pub. Date: Mar. 18, 1993

[30] Foreign Application Priority Data

Sep. 6, 1991 [NO] Norway ................................. 913527

[51] Int. Cl.[6] .................................................. B62D 25/02
[52] U.S. Cl. .................... 296/188; 296/146.6; 52/730.4; 52/731.6; 52/732.1
[58] Field of Search .................. 52/730.4, 731.6, 52/732.1, 146, 731.1, 731.2, 731.3, 731.5; 296/146.6, 188, 205, 189, 195

[56] References Cited

U.S. PATENT DOCUMENTS

| | | | |
|---|---|---|---|
| 608,861 | 8/1898 | Horton | 52/731.3 |
| 1,924,346 | 8/1933 | Blumenthal | 52/720 X |
| 2,177,896 | 10/1939 | Lee | 296/205 |
| 2,460,982 | 2/1949 | Gilpin | 52/731.6 |
| 3,088,749 | 5/1963 | Schilberg | 52/731.6 X |
| 3,241,285 | 3/1966 | Baroni | 52/731.2 |
| 3,339,334 | 9/1967 | Rowan et al. | 52/731.5 |
| 3,664,816 | 5/1972 | Finnegan . | |
| 4,023,683 | 5/1977 | Vargo | 52/720 X |
| 4,188,059 | 2/1980 | Bauer et al. | 296/188 |
| 4,826,238 | 5/1989 | Misono et al. | 52/731.6 X |
| 4,919,473 | 4/1990 | Laimighofer et al. . | |
| 4,948,196 | 8/1990 | Baba et al. | 296/188 |
| 4,986,597 | 1/1991 | Clausen | 52/731.6 |
| 5,080,427 | 1/1992 | Sturrus et al. | 296/188 |
| 5,085,485 | 2/1992 | Wurl | 296/188 X |
| 5,094,034 | 3/1992 | Freeman | 49/501 |
| 5,201,566 | 4/1993 | Mori | 296/205 X |
| 5,226,440 | 7/1993 | Fuhrman | 52/730.4 X |
| 5,228,741 | 7/1993 | Ide | 296/188 |

FOREIGN PATENT DOCUMENTS

| | | | |
|---|---|---|---|
| 0081615 | 6/1983 | European Pat. Off. . | |
| 0407372 | 1/1991 | European Pat. Off. . | |
| 711435 | 9/1931 | France | 52/720 |
| 3427537 | 2/1986 | Germany | 296/188 |
| 3806724 | 9/1989 | Germany . | |
| 2-249773 | 10/1990 | Japan | 296/195 |
| 5-77767 | 3/1993 | Japan | 296/188 |
| 1116359 | 6/1968 | United Kingdom . | |

*Primary Examiner*—Carl D. Friedman
*Assistant Examiner*—Laura A. Saladino
*Attorney, Agent, or Firm*—Wenderoth, Lind & Ponack

[57] ABSTRACT

An intrusion beam for reinforcing a body panel of a vehicle and a vehicle door is formed by a unitary extruded elongated multichamber shape. The beam is longitudinally split from one end so that resulting individual internal chambers extend at acute angles in relation to the longitudinal axis of the beam. Connection between the intrusion beam and a door frame is provided by spot welding bimetallic strips to respective ends of the beam.

28 Claims, 3 Drawing Sheets

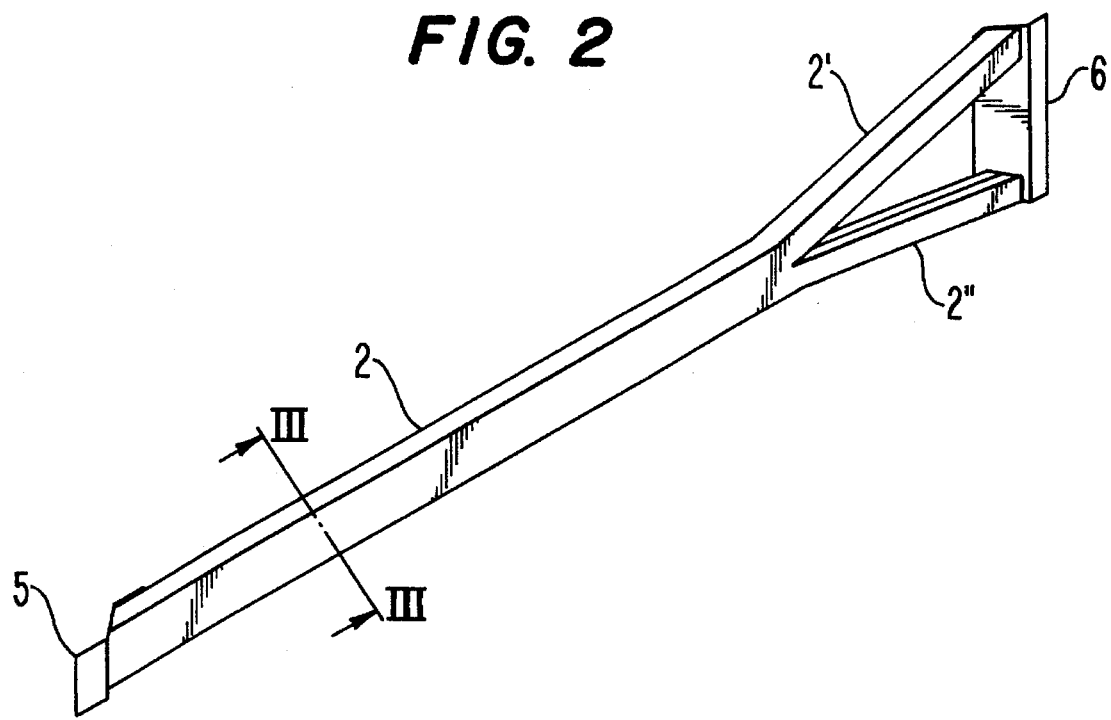

5,466,032

INTRUSION BEAM FOR REINFORCING BODY PANELS OF A VEHICLE AND A VEHICLE DOOR PROVIDED WITH SUCH BEAM

BACKGROUND OF THE INVENTION

The present invention relates to an arrangement for reinforcing vehicle side doors and walls to protect occupants against intrusion resulting from side impacts, and more particularly to a reinforcing intrusion beam therefor.

Various means for reinforcing automobile doors, generally in the form of beams connected between the front and rear of the door, are presently provided to add strength to the door in the case of a side collision. Considerations are given to the dimensions, material choice, configuration and position of the beams in order to provide maximum protection against side impact forces. Provision of weakened points in the reinforcing beam to prevent undesirable fragmentation of the beam upon impact is also known, e.g. from U.S. Pat. No. 4,919,473, and so is the provision of partly removed flanges and folding of remaining flange portions of the beam connected to the door frame to reduce the risk of passenger injury, e.g. from EP 407,372.

However, known solutions to the problem of providing a reinforcing beam that is capable of sustaining sufficient forces and at the same time ensuring an adequate connection for efficient stiffening of the entire door structure so far have been of limited effectiveness or have been complicated. This is true especially when different materials for the door structure and the intrusion beam are used, something which requires local reinforcing of the door frame in areas of connection to the beam or a general increase in the wall thickness of plate material employed in the door (body panel) according to current technology in this particular field.

SUMMARY OF THE INVENTION

Consequently, it is an object of the present invention to provide a beam construction eliminating the above drawbacks of the prior art in this field resulting in a door with improved means for transmitting impact forces to the door frame.

Another object of the invention is to provide such an intrusion beam ensuring maximum protection for the passengers against side impact forces, while simultaneously stiffening the door construction in general by transmitting forces in the case of frontal collision from the front part to the middle/rear part of the door frame and spaced frame posts.

Still another object is to provide a light metal intrusion beam which can simply be spot welded to a door structure made of steel.

BRIEF DESCRIPTION OF THE DRAWINGS

Other objects, features and advantages of the present invention will be apparent from the following description of the preferred embodiment of the beam, with reference to the accompanying drawings, wherein:

FIG. 2 is a schematic perspective view of the reinforcing beam; and

DETAILED DESCRIPTION OF THE INVENTION

Figure 1:
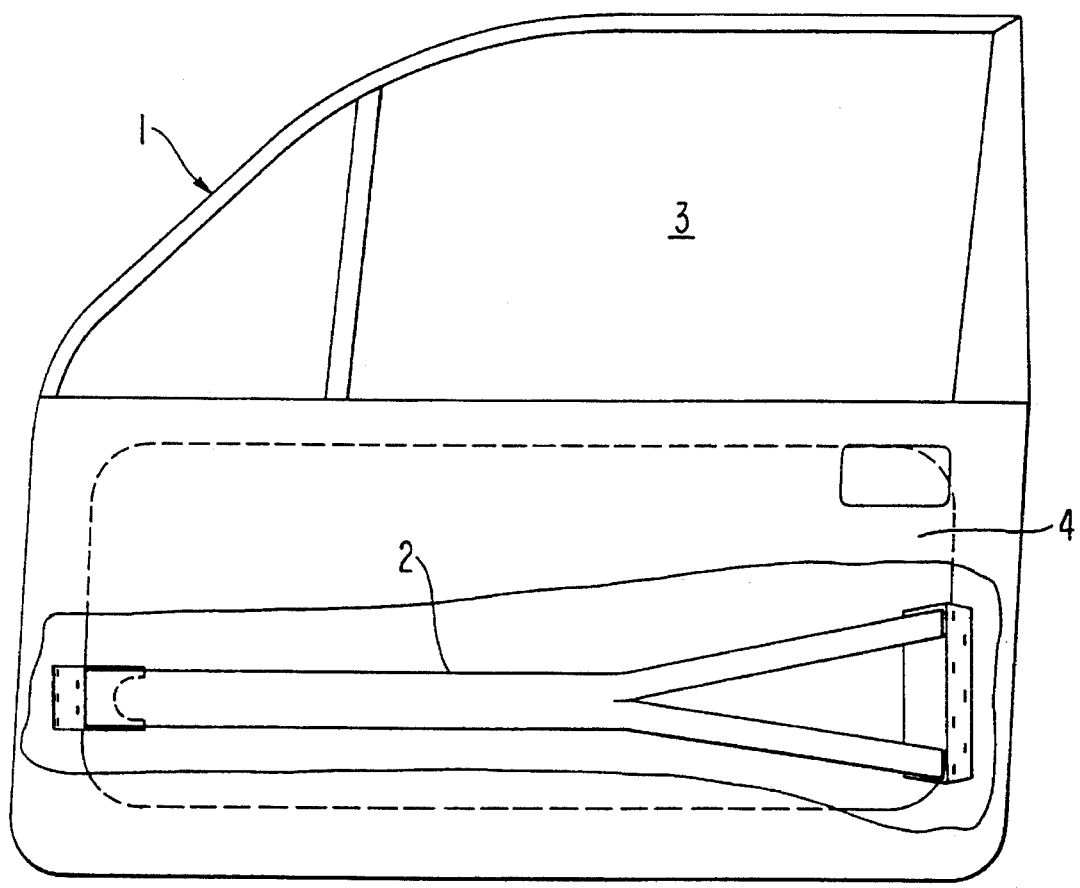
FIG. 1 is a schematic and partially fragmentary view of a vehicle side door illustrating an incorporated reinforcing beam.

Referring to FIG. 1 showing schematically a vehicle side door 1 comprising an outer side plate (body panel) 4, a window 3 and a reinforcing intrusion beam 2 extending horizontally between and fastened to front and rear door frames. The intrusion beam 2 is customarily situated at a level (height) corresponding to the front bumper arrangement of the vehicle where there is the greatest possibility of impact.

Figure 3A:
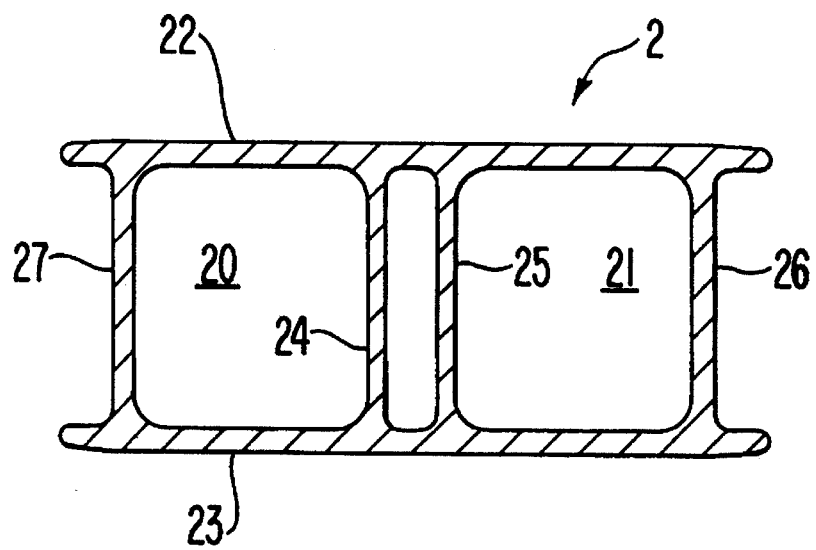
FIGS. 3a and 3b are cross-sectional views taken along line III—III in FIG. 2 of two alternative design configurations of the beam.
Figure 3B:
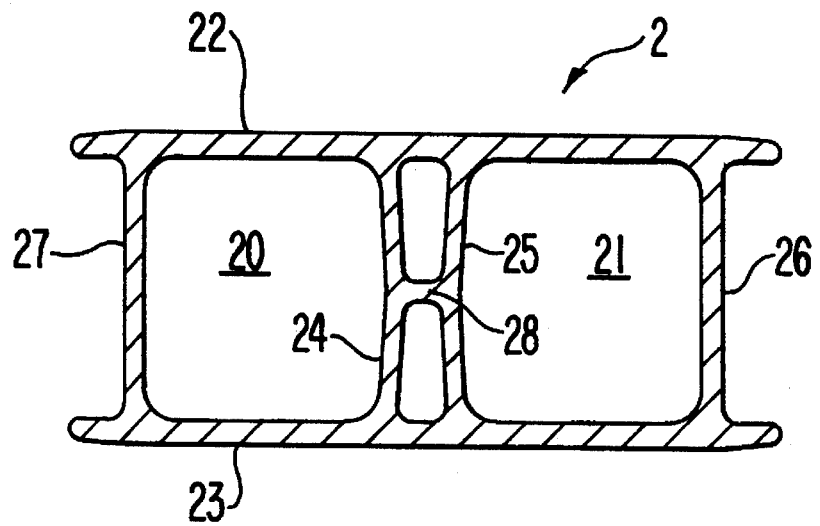

The specific configuration of the beam and the manner of its connection to the door frame will be more apparent from FIGS. 2, 3a and 3b illustrating schematically the reinforcing beam in a perspective view (FIG. 2) and as cross-sectional views.

As illustrated in FIG. 2, the beam 2 is provided as an elongated shape extruded from, e.g., aluminum or an alloy thereof and longitudinally split at one end into two branches 2', 2" and bent so that the branches diverge and extend at acute angles in relation to the main longitudinal axis of the beam. Both ends of the beam (i.e. the unitary end and the split end) are provided with respective connecting members 5, 6 consisting of bimetal AlFe plates fastened by means of welding to the beam (Al-part against Al (Al-alloy)). Provision of bimetal connecting plates facilitates greatly the subsequent assembly of the construction allowing for a simple spot welding operation in order to fasten the beam to the door frame (posts). Due to the partial split of the beam, the maximum load upon side impact is distributed over a larger area of the door frame.

Referring to FIG. 3a, the beam 2 is shown in cross-section as an extruded hollow shape defined by a pair of parallel side walls 22, 23 and transversally extending outer walls 26, 27. The beam has two parallel longitudinally extending internal chambers 20, 21 separated from each other by means of two adjacent walls 24, 25 extending transverse to side walls 22, 23. The two adjacent dividing transverse walls 24, 25 define a closed cavity between the chambers 20, 21, and this allows for the above described partial longitudinal split of the extruded shape into branches 2', 2" each branch consisting of a closed box section comprising a single chamber 20 or 21.

In a preferred embodiment of the intrusion beam according to the present invention, as illustrated in FIG. 3b, the individual adjacent transversal walls 24, 25 are interconnected by a supporting wall 28. The supporting wall 28 has a beneficial influence on the strength (stability) of the beam, thus compensating for design deviations from the most optimal cross-sectional configuration for this purpose, that is a single cavity shape. Furthermore, the dividing portion of the shape between two adjacent chambers 20, 21 delimited by the transverse walls 24, 25 interconnected by the supporting wall 28 has substantially an X-shape rather than an H-shape. This is achieved by extruding the adjacent transverse walls 24, 25 to be slightly concave compared to the substantially parallel extension of the remaining outer transverse walls 26, 27. Mechanical tests conducted on these particularly configured transverse walls of the shape show that up to 80% higher loads can be applied before collapse occurred compared to an H-shaped beam.

A special advantage of providing the intrusion beam with a partial side or end split is that the maximum load upon occurrence of a side impact is distributed over a larger area of the door frame than occurs with commercially known constructions wherein a stress load is concentrated at a point or limited area. Furthermore, besides already mentioned savings resulting from the simplified, low cost and more speedy assembling of the door structure, there is also a substantial increase in the overall stiffness of the structure due to replacement of the conventional bolt or screw connections to the welded connections between the beam and the door frame.

The scope of the present invention is not limited to the above illustrated and described specific embodiments of the invention. Modifications may be made to the invention without departing from the fundamental inventive principle. Thus, other materials than aluminum and its alloys can be employed, e.g. light metal composites based on Al or Mg metal matrices. Also, cross-sectional configurations of the extruded beam other than the illustrated substantially rectangular configuration can be employed.

We claim:

1. An intrusion beam for reinforcing a body panel of a motor vehicle, said beam comprising:
   an integral and one piece extruded elongated member having opposite first and second ends and defining at least first and second elongated internal chambers;
   said member being split longitudinally from said first end for a predetermined distance into individual first and second branches having defined therein said first and second chambers, respectively;
   said first and second branches diverging from each other at an acute angle; and
   at least one of said branches extending at an acute angle to a longitudinal axis of said beam.

2. A beam as claimed in claim 1, wherein said member has a substantially rectangular transverse cross-sectional configuration.

3. A beam as claimed in claim 2, wherein said member includes first and second parallel side walls, first and second outer transverse walls extending transverse to said side walls, first and second inner transverse walls extending transverse to said side walls and positioned between said first and second outer transverse walls, and each said chamber being defined between said side walls and respective said inner and outer transverse walls.

4. A beam as claimed in claim 3, wherein said inner transverse walls define with said side walls an elongated cavity between said chambers.

5. A beam as claimed in claim 4, wherein said member is split along said side walls and said cavity.

6. A beam as claimed in claim 1, wherein said member includes first and second parallel side walls, first and second outer transverse walls extending transverse to said side walls, first and second inner transverse walls extending transverse to said side walls and positioned between said first and second outer transverse walls, and each said chamber being defined between said side walls and respective said inner and outer transverse walls.

7. A beam as claimed in claim 6, wherein said inner transverse walls define with said side walls an elongated cavity between said chambers.

8. A beam as claimed in claim 7, wherein said member is split along said side walls and said cavity.

9. A beam as claimed in claim 1, further comprising first and second connectors attached to said first and second ends, respectively, of said member for mounting said beam to the vehicle body panel.

10. A beam as claimed in claim 9, wherein said first and second connectors comprise respective first and second connecting plates.

11. A beam as claimed in claim 10, wherein said first connecting plate is attached to both said first and second branches.

12. A beam as claimed in claim 10, wherein each said connecting plate is a bimetal element including a first portion formed of the same material as said member and a second portion formed of a material corresponding to a part of the vehicle body frame to which said beam is to be attached.

13. A beam as claimed in claim 1, wherein a major portion of the length of said elongated member, from said second end thereof to said branches, remains of unsplit and one piece configuration.

14. An assembly of a motor vehicle body panel having mounted therein an intrusion beam for reinforcing said body panel, said beam comprising:
   an integral and one piece extruded elongated member having opposite first and second ends fixed to respective frames of said body panel, said member defining therein at least first and second elongated internal chambers;
   said member being split longitudinally from said first end for a predetermined distance into first and second branches having defined therein said first and second chambers, respectively;
   said first and second branches diverging from each other at an acute angle; and
   at least one of said branches extending at an acute angle to a longitudinal axis of said beam.

15. An assembly as claimed in claim 14, wherein said body panel comprises a door of the motor vehicle.

16. A beam as claimed in claim 14, wherein said body panel comprises a side wall of the motor vehicle.

17. An assembly as claimed in claim 14, wherein said member has a substantially rectangular transverse cross-sectional configuration.

18. An assembly as claimed in claim 17, wherein said member includes first and second parallel side walls, first and second outer transverse walls extending transverse to said side walls, first and second inner transverse walls extending transverse to said side walls and positioned between said first and second outer transverse walls, and each said chamber being defined between said side walls and respective said inner and outer transverse walls.

19. An assembly as claimed in claim 18, wherein said inner transverse walls define with said side walls an elongated cavity between said chambers.

20. An assembly as claimed in claim 19, wherein said member is split along said side walls and said cavity.

21. An assembly as claimed in claim 14, wherein said member includes first and second parallel side walls, first and second outer transverse walls extending transverse to said side walls, first and second inner transverse walls extending transverse to said side walls and positioned between said first and second outer transverse walls, and each said chamber being defined between said side walls and respective said inner and outer transverse walls.

22. An assembly as claimed in claim 21, wherein said inner transverse walls define with said side walls an elongated cavity between said chambers.

23. An assembly as claimed in claim 22, wherein said member is split along said side walls and said cavity.

24. An assembly as claimed in claim 14, further comprising first and second connectors attached to said first and second ends, respectively, of said member and to said respective frames mounting said beam to said body panel.

25. An assembly as claimed in claim 24, wherein said first and second connectors comprise respective first and second connecting plates.

26. An assembly as claimed in claim 25, wherein said first connecting plate is attached to both said first and second branches.

27. An assembly as claimed in claim 25, wherein each said connecting plate is a bimetal element including a first portion formed of the same material as said member and a second portion formed of the same material as the respective said frame of said body panel.

28. An assembly as claimed in claim 14, wherein a major portion of the length of said elongated member, from said second end thereof to said branches, remains of unsplit and one piece configuration.

* * * * *